United States Patent [19]

Oelberg

[11] 4,198,096
[45] Apr. 15, 1980

[54] TRAILER WITH A DUMPING BOTTOM

[76] Inventor: George R. Oelberg, 1515 Ray Rd., Hyattsville, Md. 20782

[21] Appl. No.: 877,331

[22] Filed: Feb. 13, 1978

[51] Int. Cl.² .............................................. B60P 1/08
[52] U.S. Cl. ..................................... 298/1 B; 298/15; 298/20 R; 414/436
[58] Field of Search ................... 298/1 A, 1 B, 12, 14, 298/15, 16, 20 R, 20 A; 214/82, 350, 351, 352, 358; 56/398, 480; 414/434, 435, 436, 442

[56] References Cited

U.S. PATENT DOCUMENTS

| 97,846 | 12/1869 | Willson | 298/15 |
|---|---|---|---|
| 1,485,631 | 3/1924 | Shea | 214/82 |
| 2,284,661 | 6/1942 | Joy | 214/82 |
| 2,833,556 | 5/1958 | Kling | 298/20 R X |
| 3,237,989 | 3/1966 | Fulton | 298/1 A X |
| 4,049,137 | 9/1977 | Meyer | 298/1 B X |
| 4,062,454 | 12/1977 | Priefert | 214/358 X |

FOREIGN PATENT DOCUMENTS 343239 1/1960 Switzerland ........................... 298/20 R Primary Examiner—L. J. Paperner
Attorney, Agent, or Firm—Edmund M. Jaskiewicz

[57] ABSTRACT

A trailer has a torque arm assembly pivotally mounted between the upper front portions of a pair of opposed side walls. A bottom is slideably and pivotally supported upon a bottom support member extending between the side walls and has a upwardly extending front wall the upper edge of which is pivotally connected to a pair of torque arms extending from the torque arm assembly. Also extending from the torque arm assembly is a mounting post which can be pivotally and rotatably connected to a mounting rack detachably fastened to the bed of a pick-up truck. The torque arm assembly is pivotable between one position in which the bottom is horizontal and a second position in which the bottom is inclined downwardly toward the rear end of the frame. In the second position, the mounting post is pivoted inwardly with respect to the trailer so that the truck is received in a retracted position between the side walls of the trailer.

4 Claims, 11 Drawing Figures

TRAILER WITH A DUMPING BOTTOM

The present invention relates to a trailer which can be detachably connected to a tractor truck, more particularly, to such a trailer which has a dumping bottom pivotally and slideably mounted between the side walls of the trailer.

Various forms of trailers have been devised for the loading, conveying and dumping of a wide variety of materials including granulate materials and waste of all kinds. Many dumping trailers have been constructed which incorporate a wide variety of structures for tilting of the trailer to dump the contents therefrom. The trailer is generally tilting upwardly at the front so that the contents are dumped from the rear of the trailer. Such dumping structures have included hydraulic mechanisms, various lever arrangements and winches with cables. The tractor truck for towing the trailer must generally be substantially modified in order to provide a proper hitch for the trailer and to incorporate the necessary mechanism for dumping and otherwise controlling the trailer.

In the collection of trash and refuse many forms of specialized trailers have been devised. However, such trailers are generally characterized by having the loading structure at the front or side and utilizing hydraulic mechanism for the subsequent dumping of the contents. While such trailers are generally satisfactory in operation they become very complicated and expensive to construct and usually require two or more persons to drive the truck and to load the trailer. Further, such trailers which are generally satisfactory for refuse and trash collection are so specialized that they are not sufficiently versatile for other uses to justify their use by smaller companies and municipalities. Those trailer vehicles which have been constructed for the purpose of having more versatility than the specialized application for trash collection are rather expensive and complicated so as to preclude their wide-spread use.

It is therefore the principal object of the present invention to provide a novel and improved trailer unit.

It is another object of the present invention to provide a trailer unit whose bottom can be tilted upwardly for dumping and returned to its normal horizontal position by movement of the tractor truck with respect to the trailer.

It is a further object of the present invention to provide a trailer unit which requires a minimum of personnel for efficient operation.

It is an additional object of the present invention to provide a trailer unit having a dumping bottom and which is simple in construction, efficient in operation and inexpensive to construct and operate.

According to one aspect of the present invention a trailer vehicle has a pair of opposed upright members at the forward portion of a frame and there is a bottom support means on the frame. A torque arm assembly is pivotally mounted between the upright members. A bottom for the trailer is slideably and pivotally supported upon the bottom support means and has a front portion pivotally connected to the torque arm assembly. The torque arm assembly is pivotable between a first position in which the bottom is substantially horizontal and a second position in which the bottom front portion is raised so that the bottom is inclined downwardly toward the rear end of the frame.

The torque arm assembly comprises a pair of radially extending torque arms which are pivotally connected to an upwardly extending front wall of the bottom. A mounting post also extends radially from the torque arm assembly at an acute angle to the torque arms. The end of the mounting post is provided with means for pivotally connecting the mounting post to a mounting rack which is detachably fastened upon the bed of a truck.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
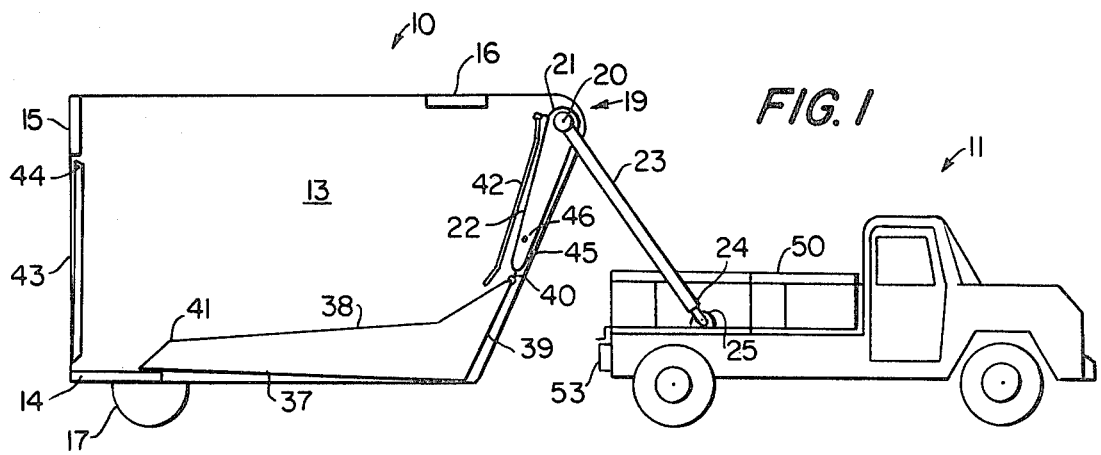
FIG. 1 is a side elevational view of the trailer according to the present invention connected to a tractor truck with the near side wall of the trailer being removed.

In FIG. 1 there is indicated generally at 10 a trailer according to the present invention which is detachably connected to a tractor truck indicated generally 11 which may be a 1-ton pick-up truck.

The trailer 10 comprises spaced opposed side walls 12 and 13 made of a suitable sheet metal such as aluminum or steel. The side walls are interconnected by a bottom support member 14 located at the bottom rear edges of the side walls and by a cross-member 15 located at the upper rear edges of the side walls. There is also provided a second cross-member 16 positioned in the forward portion of the walls to define a stop for the torque arm assembly which will be subsequently described. The side walls 12 and 13 together with the cross-members 14, 15 and 16 thus comprise the frame of the trailer. The trailer is provided with wheels 17 connected by a suitable suspension system to the bottom member 14 such that the entire trailer structure is similar to that of the conventional house trailer as known in the art. The trailer is preferably provided with fenders 18 for the wheels and also with brakes and lights as also known in the art.

Figure 5:
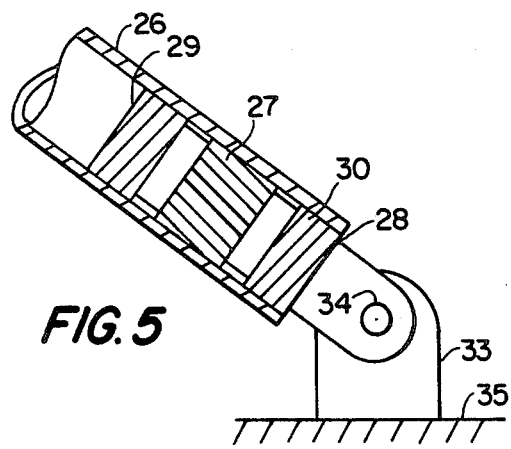
FIG. 5 is a longitudinal sectional view in enlarged scale of the free end of the mounting post showing the pivotable and rotatable connection thereon.
Figure 6:
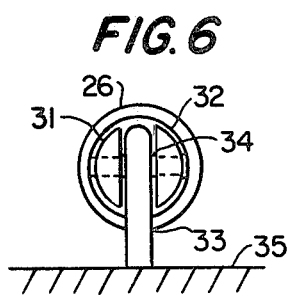
FIG. 6 is a front end view of the mounting post end of FIG. 5.

A torque arm assembly indicated generally at 19 is pivotally mounted by a shaft 20 between the upper forward portions of the side walls 12 and 13. The torque arm assembly comprises a cross-bar 21 from which extends radially downwardly as seen in FIG. 1 a pair of torque arms 22. Also extending radially from the cross-bar 21 and positioned forwardly from the torque arms 22 at an acute angle of approximately 50° is a mounting post 23 whose length is approximately twice the length of a torque arm 22. The lower or free end of the mounting post indicated at 24 is provided with a rotatable and pivotable connection 25 which is illustrated in greater detail in FIGS. 5 and 6. The mounting post 23 comprises a steel or aluminum tubular member 26 within the lower end of which is attached an annular collar 27, such as by rosette welds. Rotatably received within the collar 27 is a shaft 28 upon which are welded a pair of spaced collars 29 and 30 on both sides of the fixed collar 27 so that shaft 28 together with the collars 29 and 30 is rotatable within the free end of the tubular member 26 but is fixed therein against axial displacement.

The outer end of the shaft portion 28 is bi-furcated to form longitudinal arms 31 and 32 between which is received a mounting bracket 33 secured to the arms by means of a removeable pin 34. The bracket 33 is securely fixed such as by welding to a bottom member 35 of a mounting rack 36 detachably connected to the bed of the pick-up truck 11.

Within the trailer is a bottom 37 having opposed side walls 38 shaped as shown in FIG. 1 and at the forward position is an upwardly extending front wall 39. The front wall is pivotally connected by links 40 to the lower ends of the torque arms 22. In the horizontal position of the bottom 37 as shown in FIG. 1 the rear portion 41 of the bottom is slideably supported on the bottom support member 14. The bottom 37 is preferably made of a heavy plate steel and may be of an all-welded construction.

Pivotally supported for free swinging movement from the cross-bar 21 is a front gate 42 which extends just below the upper edge of front wall 39. The front gate is of a light-weight construction such as of aluminum and is lightly pivoted so it can be easily moved.

The rear end of the trailer 10 is closed by a rear gate 43 which is pivoted from a shaft 44 extending between the side walls and positioned immediately below the cross-member 15.

Figure 2:
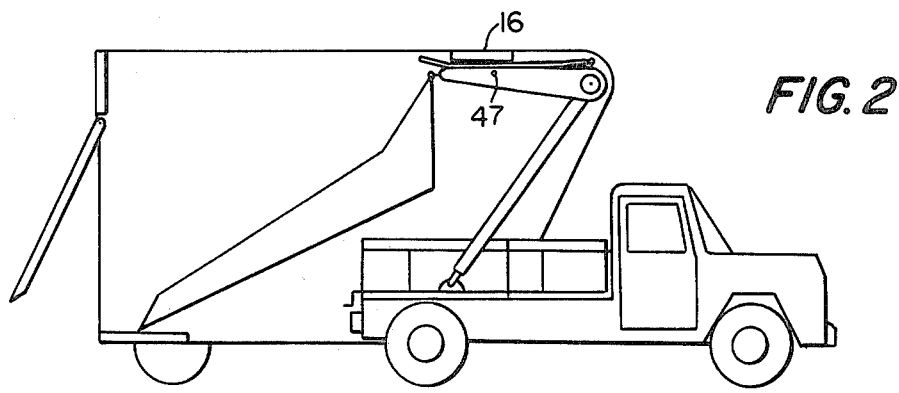
FIG. 2 is a view similar to that of FIG. 1 but showing the tractor truck in its retracted position wherein the bottom of the trailer is inclined to the dumping position.
Figure 3:
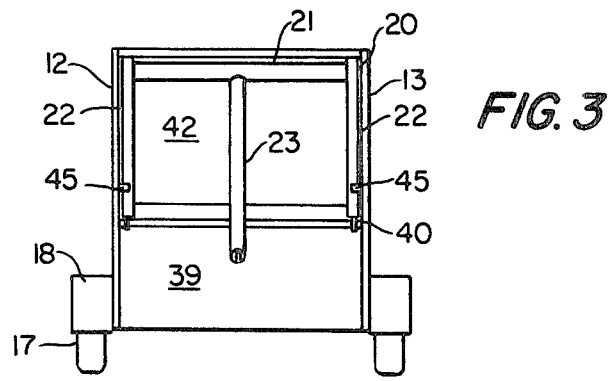
FIG. 3 is a front elevational view of the trailer.
Figure 4:
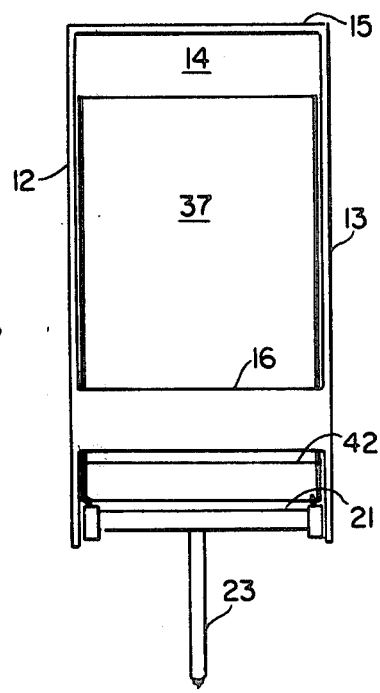
FIG. 4 is a top plan view of the trailer.

The torque arms 22 of the torque arm assembly 29 are limited in their pivoting in the forward direction as shown in FIG. 1 by a pair of stops 45 which comprise inwardly directed brackets secured to the forward edge of the side walls. The brackets may be in the form of rods or bars and are inclined inwardly at a slight angle in order to keep the side walls of the trailer from spreading when the torque arms engage the brackets 45. The pivoting of the torque arms 22 rearwardly into their retracted position as shown in FIG. 2 is limited by the upper cross-member 16. The torque arms may be locked in their forward and upper positions as shown in FIGS. 1 and 2 respectively by electrically operated solenoid locks 46 and 47 which locks may each comprise an armature which extends outwardly to engage with a suitable recess in the outer faces of the torque arms.

Figure 7:
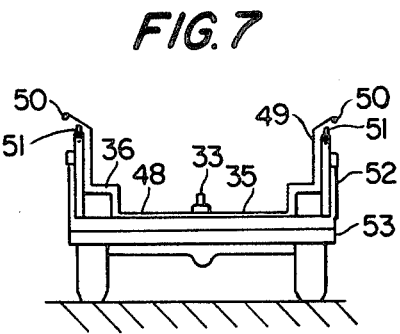
FIG. 7 is a rear end view of the tractor truck showing the mounting rack position thereon.

The mounting rack bottom 35 as shown in FIG. 7 may comprise a bottom plate member 48. The bottom 35 may also comprise a smaller plate upon which the bracket 33 is mounted and then connected by a series or rods to form a frame to constitute the bottom 35. Extending vertically upwardly from the bottom 35 are bent upright brackets 49 to fit over the wheel well and to extend over the tops of the sides of the pick-up truck bed. Longitudinally extending guide rails 50 are positioned on the ends of the upright brackets as shown and the guide rails extend outwardly beyond the sides of the pick-up truck so as to form protective guide rails for the sides of the truck when the truck is retracted into the trailer as shown in FIG. 2. A plurality of downwardly extending pins 51 are provided along the upper bent edge of the uprights and these pins 51 are positioned to fit in stake holes which are normally found along the upper edge of the side walls of pick-up trucks. The forward end of the rack can be secured in position by means of a turn buckle arrangement 52 interconnected between the forward uprights and a hook or bracket found on the lower part of the side walls. The rearward portion of the mounting rack is positioned by pins which are inserted into holes found or made on a rear step bumper 53. The rear step bumper is also a common structure on such pick-up trucks. The rear portion of the mounting rack is thus so constructed that the protective guide rail structure of the rack does not obstruct the brake and tail lights on the rear of the truck nor will the guide rail structure obstruct the use of the truck tail gate.

As may be seen in FIG. 1 the connecting bracket 33 on the mounting bed is positioned forwardly of the rear axle of the truck. When the trailer is connected to the truck, the weight exerted through the mounting post pushes the mounting rack 33 downwardly and assists in maintaining the mounting rack in position.

The distance between the side walls 12 and 13 of the trailer is greater than the width of the protective rails 50 on the mounting rack positioned upon the truck. The truck is thus readily backed into the trailer and the mounting rails protect the truck from being damaged during those operations when the truck is either being backed into the trailer or being moved out of the trailer.

As a protective measure, safety chains may be provided to connect the mounting post to the mounting rack or bed of the truck when the trailer is being towed by the truck in the position as shown in FIG. 1.

In the operation and functioning of the trailer, the trailer can be loaded either through the rear or through the front. The front tail gate 42 can be easily swung to an open position by one person using only a very small force when the trailer is loaded from the front. A front loading of the trailer is particularly useful when the truck and trailer unit is being used for the collection of trash. For trash collection, only one man is necessary. One man can drive the truck and at each stop can load the trash through the front end of the trailer. The distance that the man must thus move between the front driving section of the truck and the rear of the truck to load the trash is only the length of the pick-up truck. The lowered cost efficiency of collecting trash using only one man per collection unit is particularly useful for smaller companies and municipalities.

After the trailer has been loaded, the brakes on the trailer are locked as known in the art and the truck is backed into the trailer into the retracted position as shown in FIG. 2. This movement of the truck into the retracted position also compacts the load against the rear tail gate 43 which can be locked in its down or closed position.

Also, the truck is backed into the trailer as shown in FIG. 2 to unload the trailer. The backing of the truck actuates the torque arm assembly which causes the bottom rear end 41 to slide rearwardly upon the bottom support member 14 while raising the bottom to its tilted position as shown in FIG. 2. When the rear tail gate 43 is opened, the load can be dumped from the trailer. Thus, the frame of the trailer comprising the side walls and supports remains in its normal horizontal position but only the bottom is tilted upwardly into a dumping position.

The trailer and truck unit can also be driven upon the road when the truck is in the retracted position as shown in FIG. 2. When the trailer is driven upon the road in the position as shown in FIG. 2, the torque arm is locked in its uppermost position by the solenoid locks 47 and the trailer and truck present a compact vehicular unit.

The top of the trailer can either be left open or may be closed for particular applications. For most purposes, the top can be closed by means of a tarpaulin or the like. However, the trailer can also be constructed with a top permanently attached in place.

It is thus apparent that all of the mechanism for actuating the bottom is connected to the cross-bar 21 of the torque arm assembly 19. This mechanism consists of the torque arms pivotally connected to the bottom and the mounting post which is rotatably and pivotally connected to the truck. The movement of the truck with respect to the stationary trailer brings about a pivoting of the mounting post with respect to the truck. When the truck is turned in either direction in its outer position as shown in FIG. 1, then the mounting post will rotate or swivel about its connecting bracket with the truck.

Figure 8:
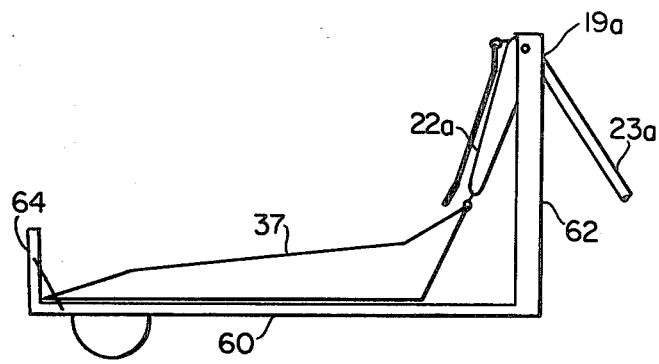
FIG. 8 is a side elevational view of a modification of the trailer.
Figure 9:
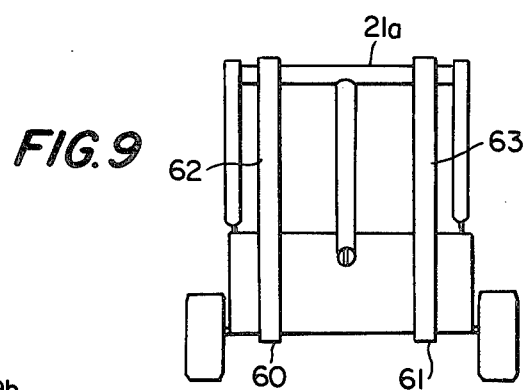
FIG. 9 is a front end view of the trailer modification of FIG. 8.

In FIGS. 8 and 9 there is shown a modification of the trailer structure as described above. The bottom 37 is pivotally and slideably mounted on a pair of longitudinally extending frame members 60 and 61 which are spaced apart a distance considerably less than the width of the bottom as may be seen in FIG. 9. The forward ends of the frame members 60 and 61 are provided with vertical uprights 62 and 63 at the upper ends of which is pivotally mounted a torque arm assembly 19a. The torque arm assembly 19a is similarly provided with torque arms 22a which are pivotally connected to the upper edge of the front wall of the bottom and with a mounting post 23a which is similarly connected to a tractor truck.

In this modification, the cross-bar 21a need only extend between the uprights 62 and 63 and the torque arms 22a can be positioned outwardly of these uprights.

Figure 10:
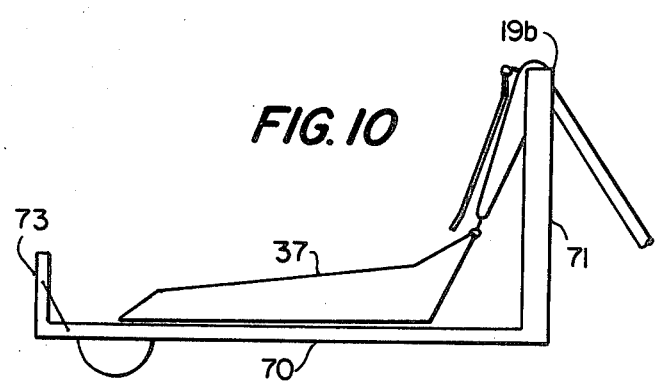
FIG. 10 is a side elevational view of a further modification of the trailer.
Figure 11:
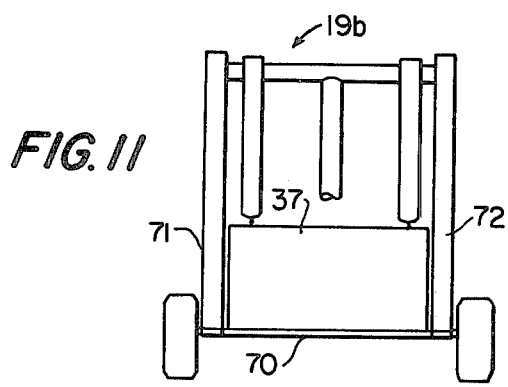
FIG. 11 is a front end view of the trailer modification of FIG. 10.

In the modification of the trailer as shown in FIGS. 10 and 11, the bottom 37 is slideably and pivotally mounted upon a bottom plate 70 which is of a rigid steel construction and constitutes the frame of the trailer. The plate 70 is longer and wider than the bottom as may be seen in FIGS. 10 and 11.

At the forward end of the plate frame 70 are positioned vertical uprights 71 and 72 between the upper ends of which is pivotally mounted a torque arm assembly 19b. The torque arm assembly 19b is the same as the torque arm assembly 19 in FIGS. 1 and 2 since in this modification the uprights 71 and 72 correspond to the side walls 12 and 13 of FIGS. 1 and 2 between which the torque arm assembly is mounted.

The modification of FIGS. 8, 9 may be provided with a rear tail gate 64 and the modification of FIGS. 10, 11 may be provided with a tail gate 73. These tail gates function primarily to maintain the load upon the bottom. The loads which can be carried by the modifications of FIGS. 8-11 are thus limited since there is no side wall structure to contain the load. Also, these modifications can not be used to compact the load. However, the modifications of FIGS. 8-11 are particularly suitable for hauling heavier granular materials such as gravel, crushed rock or stone and similar materials.

Thus it can be seen that the present invention has disclosed a versatile trailer unit of a simple construction which has a dumping bottom actuated only by a torque arms structure connected to a tractor truck. The trailer unit can be constructed at a relatively low cost since the need of hydraulic and other power units is not necessary for the dumping operation. The dumping function is performed solely by the rearward movement of the tractor truck between the side walls of the trailer. It is thus not necessary to tilt the entire trailer but only the bottom which is slideably and pivotably positioned upon a bottom frame member. Further, this trailer permits front or rear end loading. While the trailer has particular application to trash and refuse collection, the trailer can be used for hauling a wide variety of loads such as might be encountered in agricultural and industrial operations.

It will be understood that this invention is susceptible to modification in order to adapt it to different usages and conditions, and accordingly, it is desired to comprehend such modifications within this invention as may fall within the scope of the appended claims.

What is claimed is:

1. A trailer vehicle comprising a frame including a pair of opposed upright members at the front end thereof and a bottom support means, a torque arm assembly pivotally mounted between said frame upright members, a bottom slideably and pivotally supported upon said bottom support means and having a front portion pivotally connected to said torque arm assembly, said torque arm assembly being pivotable between a first position in which said bottom is substantially horizontal and a second position in which said bottom front portion is raised so that said bottom is inclined downwardly toward the rear end of the frame, said torque arm assembly comprising a cross-bar pivotally mounted between said upright members and a pair of torque arms extending radially from said cross-bar toward the front portion of said bottom when said bottom is in the horizontal position, and a mounting post extending radially from said cross-bar forwardly of the trailer vehicle at an acute angle from said torque arms, said mounting post having a free end and means on said free end for pivotally and rotatably connecting said mounting post to a tractor truck.

2. A trailer vehicle comprising a frame including a pair of opposed upright members at the front end thereof and a bottom support means, a torque arm assembly pivotally mounted between said frame upright members, a bottom slideably and pivotally supported upon said bottom support means and having a front portion pivotally connected to said torque arm assembly, said torque arm assembly being pivotable between a first position in which said bottom is substantially horizontal and a second position in which said bottom front portion is raised so that said bottom is inclined downwardly toward the rear end of the frame, said bottom front portion comprising an upwardly extending front wall and there being an upper edge thereon, said torque arm assembly being pivotally connected to the upper edge of said front wall, and said torque arm assembly comprising a cross-bar pivotally mounted between said upright members and a pair of torque arms extending radially from said cross-bar toward the front portion of said bottom when said bottom is in the horizontal position, and a gate pivotally mounted on said cross-bar and extending to substantially the upper edge of said bottom front wall.

3. A vehicular unit comprising a truck having a bed, a mounting rack detachably fastened upon said bed, a trailer having a pivotable bottom and having a pivotable torque arm assembly, said torque arm assembly comprising a pair of torque arms radially extending therefrom and pivotally connected to said bottom, said torque arm assembly further comprising a mounting post radially extending therefrom at an acute angle from said torque arm and having a free end, and means on the free end of said mounting post for pivotally and rotatably connecting said mounting post to said mounting rack so that said trailer can be towed by said truck, said trailer has a pair of opposed side walls with said bottom and torque arm assembly being disposed therebetween.

4. A vehicular unit as claimed in claim 3 wherein said side walls are spaced a distance greater than the width of said truck, said truck being in a retracted position between said side walls when said torque arm assembly is pivoted into its second position.

* * * * *